Nov. 7, 1950          H. F. KAISER          2,528,521
RADIOGRAPHIC UNIT
Filed Nov. 12, 1948          3 Sheets-Sheet 1
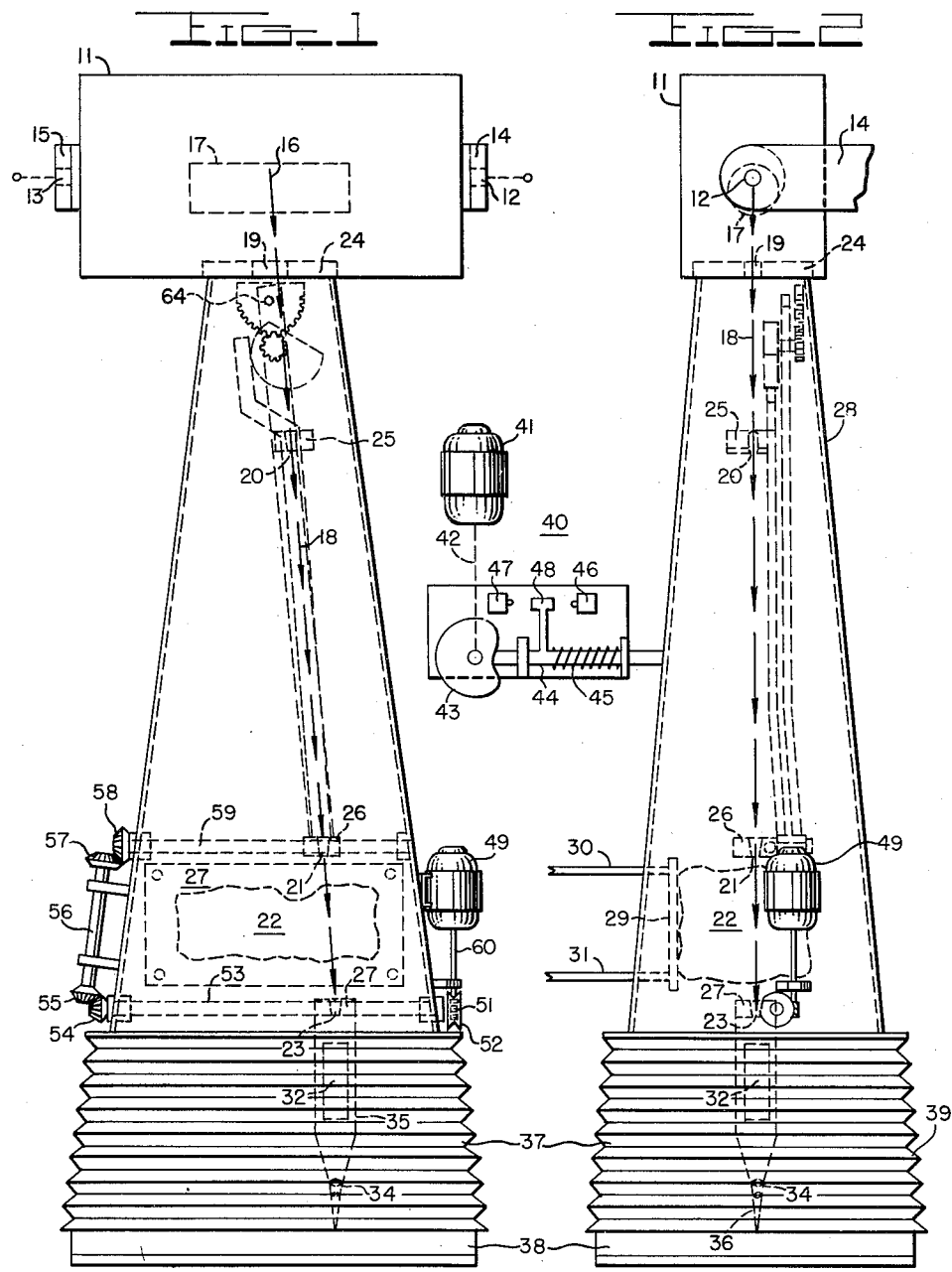
INVENTOR.
HERMAN F. KAISER
BY
*M. C. Hayes*
ATTORNEY

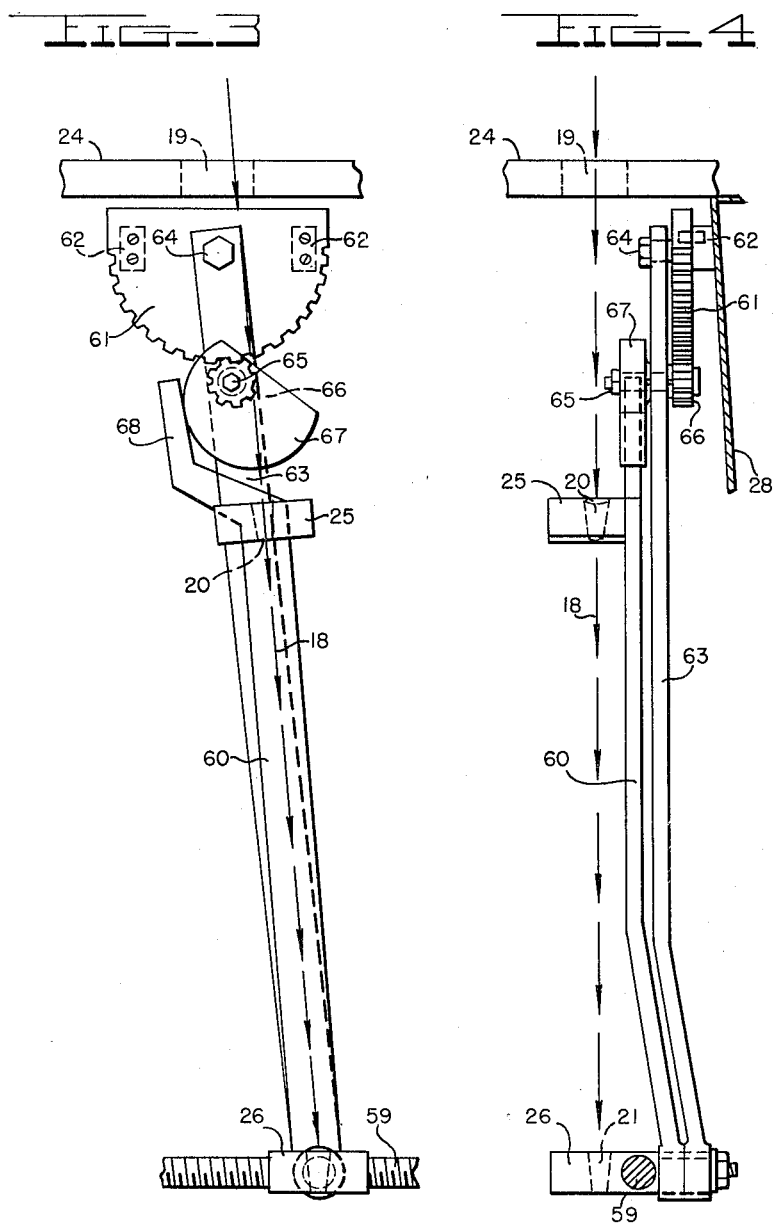

Nov. 7, 1950  H. F. KAISER  2,528,521
RADIOGRAPHIC UNIT
Filed Nov. 12, 1948  3 Sheets-Sheet 3

INVENTOR.
HERMAN F. KAISER
BY
*M. C. Hayes*
ATTORNEY

Patented Nov. 7, 1950

2,528,521

UNITED STATES PATENT OFFICE 2,528,521

RADIOGRAPHIC UNIT

Herman F. Kaiser, Washington, D. C.

Application November 12, 1948, Serial No. 59,735

6 Claims. (Cl. 250—145)

(Granted under the act of March 3, 1883, as amended April 30, 1928; 370 O. G. 757)

The present invention relates in general to the examining and testing of opaque objects and more particularly to radiographic testing systems having means for eliminating blurring and inaccuracies due to secondary or scattered radiation.

Radiographic testing systems for the examination of opaque objects as to density, and presence and size of flaws or impurities by passing penetrating radiation such as X-ray, gamma-ray, or corpuscular radiation through the object and detecting the emergent radiation by means of an ionization chamber or Geiger-Mueller counting tube and suitable measuring circuits, or by a radiographic recording cassette, are well known. However, such systems, particularly those producing a radiographic image of the test object in a recording cassette, are subject to irregular measurement and faulty image recording due to scattering of the radiation beam and to secondary radiation from particles making up the test object. Since these systems rely primarily on the point by point detection of radiation transmitted through portions of the test object aligned with the source of radiation and progressive points on the plane of the detector, the scattered or secondary radiation, directed at an angle to the direction of propagation of the primary radiation beam, will produce, at the point at which they encounter the detector, radiation intensities other than those obtaining due to the primary emergent radiation alone.

The practice of recording the emergent radiation on a photographic recording surface is preferred, in the examination of small objects for impurities of flaws, to measuring the variations in emergent radiation intensity with a Geiger-Mueller counting tube or ionization chamber, due to the fact that the former method produces a picture of the object from which the presence, position and magnitude of any flaws can be instantly and easily determined. Examination of objects by this method, however, is somewhat slower than with counter tubes since the response of the recording surface to the radiation to produce a satisfactory image is slower, and requires that the beam be scanned over the object at a comparatively slow rate of scanning.

Accordingly, it is an object of this invention to provide a radiographic inspection device adapted to prevent blurring and inaccuracies due to scattered and secondary radiation.

Another object of the invention is to provide an improved and simplified radiographic inspection device.

Another object of the invention is to provide a device for rapidly inspecting and scanning an opaque test object and recording a radiographic image of the test object.

Another object of the invention is to provide a radiographic inspection device in which a beam of radiation of small cross section is progressively scanned over the total area of a test object.

In accordance with the invention, it is proposed to eliminate scattering and secondary radiation and to provide for the rapid and accurate scanning of objects opaque to light in order to produce an accurate radiographic image of the object, by forming penetrating radiation from a standard radiation source into a collimated beam whose directional axis is substantially perpendicular to the incident surface of the test object, sweeping the incident beam across the test object through successive parallel planes so as to scan the beam point by point throughout the entire volume of the test object, detecting the emergent radiation by a radiation sensitive device, and producing a permanent radiographic image of the object. The means forming the radiation emitted from the source into a small cross section collimated beam permit only the primary rays of radiation to pass therethrough. This means is placed on both sides of the test object so as to transmit only the primary rays of the incident and emergent radiation, thus rejecting all secondary and scattered radiation originating in the test object.

To provide for the rapid production of a radiographic density image of the test object, a Geiger-Mueller counting tube or equivalent detecting means is positioned to be moved with the collimated beam so as to always be in a position to intercept the emergent radiation from the objects and generate electrical impulses on reception of rays of emergent radiation. Well known or conventional light generating means are electrically coupled to the output of the counter tube to vary the light output intensity as a function of the intensity of received or detected emergent radiation, and conventional photographic recording means are positioned in fixed relation with the test object in positional and intensity or amplitude relationship with the sweeping incident beam of radiation.

Further aims, objects and advantages of this invention will appear from a consideration of the following description and the accompanying drawings showing for purely illustrative purposes a preferred embodiment of this invention. It is to be understood, however, that the description is not to be taken in a limiting sense, the scope of the invention being defined in the appended claims.

Referring to the drawings:

Fig. 1 is a front elevation, of the radiographic inspection device showing the relative position of elements near the beginning of a radiographic examination of an object;

Fig. 2 is a side elevation of the radiographic inspection device showing the members at the center point of an oscillatory sweep;

Fig. 3 is a detail view in side elevation, similar to the view shown in Fig. 1 in dotted lines, of the center correction means by which the series of beam-defining slits are axially aligned with the source of penetrating radiation;

Fig. 4 is a front view of Fig. 3;

Figure 5:
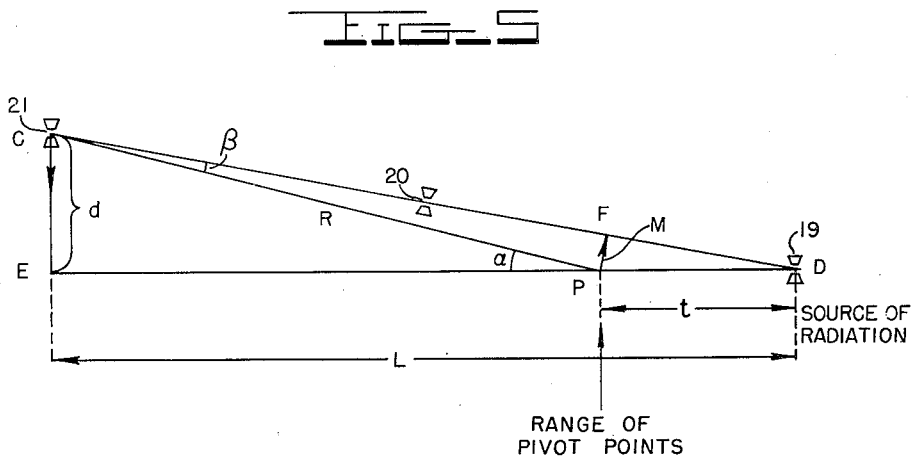
Fig. 5 is a schematic diagram depicting geometrically the positioned relationship between the beam-defining slits and the source of radiation from which the proper center correction can be calculated.

Referring now to Figs. 1 and 2 showing the front and side view respectively, of the radiographic device, a conventional tube head 11 supporting an X-ray tube or other conventional source of penetrating radiation is mounted to permit rotation about the axis 0—0, passing approximately through the surface on which is located the point-source of said radiation, by means of support members 12 and 13 extending from each side thereof into fixed support members 14 and 15. Ideally, the axis should pass through the target-source, but since the radiation propagates in all directions this is not a necessary condition for operation. In this embodiment, the radiation is generated in the form of a conical beam directed at substantially right angles to the axis 0—0 from the target 16 of a conventional X-ray tube 17. The said conical beam is formed into a beam 18 of small circular or rectangular cross-section by means of slits 19, 20 and 21 positioned to intercept the beam radiated toward a test object 22, and a slit 23 positioned to intercept the radiation emerging from the test object 22. The slits 19, 20, 21 and 23 are formed in plates or blocks 24, 25, 26 and 27 respectively, carried by a carriage or frame member 28 secured to the tube head 11.

The test object 22 is adapted to be supported independently of the carriage 28, by means of a supporting plate 29 and externally projecting rod support members 30 and 31 and fixed support means (not shown). Thus the small cross-section, collimated beam of radiation 18 may be angularly swept about the axis 0—0 through a portion of the volume occupied by the test object 22.

The rays emanating from the target 16 are first limited in angle within the tube head by plate 24 carrying the slit 19 to substantially lessen the circular cross-section of the conical beam of radiation emanating from the target 16. The beam of radiation then passes through slits 20 and 21 in slit-defining plates 25 and 26, respectively, to further limit the cross-section of the beam of radiation, the slits 20 and 21 being kept in line with a point on the target 22 by a mechanism to be later described. After passage through the beam-defining slit 21, the beam of radiation passes through the test object 22 in the form of a beam of small circular or rectangular cross-section depending on the configuration of the slit 21. The emergent radiation from the test object 22 then enters a limiting slit 23 which blocks off radiation entering at any considerable angle to the main primary beam of radiation, and is passed to a radiation sensitive detector means now described.

Figure 6:
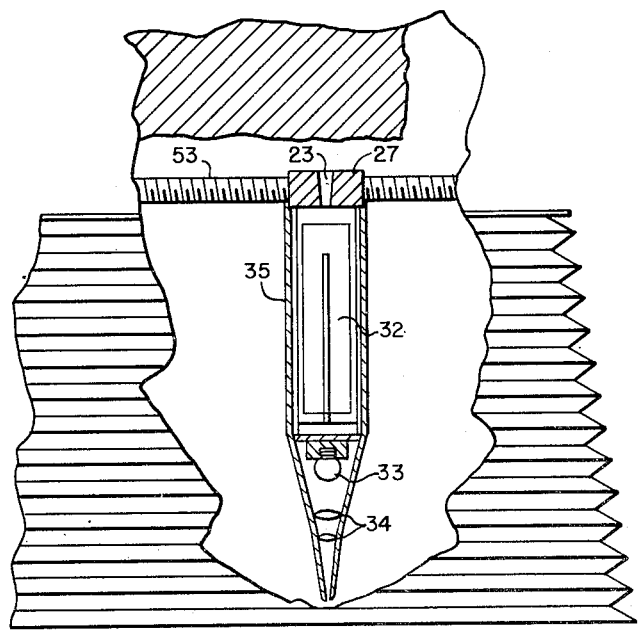
Fig. 6 is a detail section of the detecting and light generating means.

This detector means 32 comprises a Geiger-Mueller counter tube or ionization chamber of conventional type. Such ionization chambers or Geiger-Mueller tubes are adapted, when penetrating radiation of predetermined radiation characteristics is received thereby, to generate a pulse of electrical current whose amplitude is proportional to the amplitude of received radiation. The electrical current thus generated is coupled to conventional amplifier means, not shown, to generate an electrical current of predetermined amplitude variations proportional to the amplitude of the current generated by detector tube 32. This amplified output is coupled to an illuminating means 33 (Fig. 6) such as an electric lamp to generate, through an image forming lens system 34, a beam of light whose intensity is proportional to, or varies in a desired way with, the intensity of received radiation in the detector tube 32. The detector tube 32, light 33 and objective lens system 34 are all carried in a unitary structure 35 mounted on the slit-forming member 27 as shown in the cutaway detail section view in Fig. 6. The upper portion of the unitary structure 35 housing the detector tube 32 protects the detector tube from stray radiation approaching the tube from points other than through the slit 23, while the lower portion of the unitary housing member 35 is formed into a light-tight chamber in which the lamp 33 and objective lens system 34 are positioned to focus a narrow beam of light coaxial with the beam of radiation 18 onto a photographic recording surface held in a stationary holder 38, fixed relative to the position of the object 22. The entire photographic image-forming assembly is enclosed within a light-tight bellows member 37 to prevent light originating from any source other than the lamp 33 from impinging on the photographic recording surface.

To permit the beam of radiation 18 to be scanned over the entire surface of the test object 22 to generate a photographic image of the entire object, the slit system comprising slits 20, 21 and 23, and thus the beam of radiation defined thereby, is swept successively across the surface of the test object 22 through laterally spaced parallel planes so that, by coordination of the oscillatory sweeping motion of carriage 28 about the axis 0—0 and the stepwise lateral motion of the slit system at right angles to the plane of sweeping, the beam will ultimately scan the entire test object line by line.

Means 40 is provided to oscillate the frame 28 about the axis 0—0 defined by the trunnions 12 and 13 and support members 14 and 15. This means causes the narrow beam of radiation 18 to be swept back and forth across the incident surface of the test object 22 so as to scan the object in lines. This reciprocating mechanism 40 comprises a continuously driving motor 41 coupled through mechanical coupling 42 to a driving cam 43 which transmits oscillatory motion determined by the cut of the cam surface through a shaft 44 held against the cam surface by spring 45 to the carriage 28. The cam surface is so cut as to cause the beam of radiation to sweep across the test object 22 at a speed varying in such a way as to insure uniform exposure of the detector tube 32 to the emergent radiation from the test object 22. Electrical contacts 46 and 47, such as micro-switches, are mounted on the motor drive unit 40 to be engaged by a tripping member 48 fixedly carried on the shaft 44 to serve as switching means by which driving means below described are energized at each extremity of the oscillation of the carriage 28 to move the slit system in step by step fashion in a direction perpendicular to the plane of oscillation. The micro-switches 46 and 47 are coupled in series in the energizing circuit of a driver motor 49 mechanically coupled to the slit-forming members 26 and 27 to drive the slit-forming members a predetermined amount when said micro-switches 46 and 47 are energized and thereby to shift, at the extremity of each oscillation, the position of the slits and of the beam formed thereby, transversely relative to the scanning plane generated by oscillation of the carriage 28.

The slit-forming blocks 26 and 27 are threaded on lead screws 59 and 53 respectively. Block 27 is driven axially along lead screw 53 as said screw is rotated by motor 49 through shaft 60 and gearing means 51 and 52. The slit-forming block 26 is driven transversely in predetermined positional relationship with the slit-forming block 27 by means of bevel gears 54 and 55, a shaft 56 coupled to bevel gear 55, bevel gears 57 and 58, and lead screw 59 which is fixed to the bevel gear 58.

Since the physical characteristics of radiographic devices will often not permit the beam-defining means, such as assembly of slits 20, 21 and 23, to be pivotally supported on an axis passing through the source of radiation 16, center correction means are required to permit the series of slits to be pivoted on an axis removed from the source of radiation and to maintain the slit axially aligned with the source of radiation 16. In describing the details of the center correction means, reference will be had to Figs. 3, 4 and 5.

Referring to Figs. 3 and 4, the slit 20 in the slit-defining block 25 is mounted together with the slit 21 in the slit-defining block 26 on an arm 60 pivoted to the block 26 and free at its upper end. Since it may be impossible to maintain a mechanical pivot at the radiation source, arm 60 (and thereby the slit axis) is maintained with its axis pointed toward the source by a mechanism to be described below. The principle and operation of the alignment adjustor mechanism may be understood more clearly by reference to the Fig. 5 in view of Figs. 3 and 4.

Fig. 5 shows the conditions to be met. Point D is the radiation source (corresponding substantially to slit 19). Point C corresponds to slit 21, point P to the mechanical pivot point 64 around which arm 63 is rotated, point F the hypothetical effective position of 64 in order to have the slits axially aligned when the beam is sweeping one of the extremities of the test object 22, and point E corresponds to the center point of the photographic recording surface. R is the unaligned axis of the slit centers of arm 60. Slit 21 is moved along the line EC normal to ED, a line from the mid-point of the lateral travel path to the target at D. On line CFD (the aligned axis of arm 60) are located the slits 21 and 20 when conditions for sweeping an extremity of the object are satisfied. Thus it is seen that for the conditions to be satisfied there must be provided means for maintaining point P (F) in the slit line between points D and C, such as by a moving pivot point at 64 or means for aligning the slits with point F independently of arm 63. In the embodiment shown the latter means are employed. An alternative method of maintaining alignment of the slits is to mechanically couple the upper slit 20 to driving means 49, similarly to the coupling of slits 21 and 23.

Consideration of the triangle CDP will show that $$\frac{\sin(180-\alpha)}{\sqrt{d^2+L^2}} = \frac{\sin \beta}{t} \quad (1)$$

where $t$, $d$, $L$, $\alpha$ and $\beta$ are the lengths and angles indicated. Distance $t$ varies with angle $\alpha$ so that $t = t_0 + R(1 - \cos \alpha)$ where $t_0$ is the value of $t$ when C is at E or ($\alpha = 0$). R being of fixed value, $d$ is given by the equation $d = R(\sin \alpha)$. The above expression then becomes $$\frac{\sin \alpha}{\sqrt{L^2 + R^2 \sin^2 \alpha}} = \frac{\sin \beta}{t_0 + R(1 - \cos \alpha)} \quad (2)$$

To compute the necessary displacement PF normal to CP, the following relationship obtains;

$$M = R \tan \beta = \frac{R \sin \beta}{\sqrt{1 - \sin^2 \beta}} = R f(\alpha) \quad (3)$$

Since $\sin \beta$ is obtained from Equation 2, M may be computed. The displacement M may be brought about by means of an extension of the free end of radius rod 60, which is adapted to be engaged by a cam having a surface radius or angle function given by Equations 2 and 3 combined.

Figs. 3 and 4 show a preferred embodiment of alignment adjustment means employed. A gear 61 of semi-circular configuration is mounted by means of pin and slot connection 62 to frame 29. An arm 63 is pivoted to the point 64 on the gear 61 and at its other end to the slit-defining block 26 to provide the radius axis about which the slit-defining system is rotated to attain alignment as described above. Mounted on a pivot pin 65 carried by the arm 63 is a gear 66 adapted to engage the peripheral face of the gear 61, and a cam 67, both the gear 66 and the cam 67 being keyed to the pivot pin 65 to rotate in unison. Extension member 68 at the free end of the arm 60 is positioned to ride on the surface of the cam 67 to shift the axis of the arm 60 carrying the slit-defining blocks 25 and 26 relative to the axis of the radius rod 63 as a function of the angular orientation of the radius rod 63 and thus maintain the axis of the slits 20 and 21 aligned with the source of radiation. The radius versus angle function of the cam surface of the cam 67 is determined by Equations 2 and 3 above mentioned to maintain the axis of the radius rod 60 properly aligned. With proper choice of gears 61 and 66, the angular variations of slits 21 can be made any desired multiples of the angle through which the radius arm 63 is moved about the pivot point 64. The extension 68 riding on the surface of the cam 67 is constrained against the cam surface either by a spring or a track (not shown) at the edge of the cam 67. The displacement of the arm 60 in both directions relative to the axis of the radius rod 63 is secured by placing the starting point in the middle of the cam surface 67.

By the above defined means, the beam of penetrating radiation of small cross-section is swept across the incident surface of the test object 22 parallel to one axis of the surface of the object by means of the reciprocating mechanism 40, while energization of the motor 49 through contacts 46 and 47 at the extremities of each sweep of the beam in the above mentioned plane causes the beam to shift laterally in a direction normal to the axis swept by the reciprocating mechanism 40, and thus is made to progressively scan the entire incident surface of the test object.

Various modifications may be made in the invention without departing from the spirit and scope thereof, and it is desired, therefore, that only such limitations shall be placed thereon as are imposed by the prior art and are set forth in the appended claims.

The invention described herein may be manufactured and used by or for the Government of the United States of America for governmental purposes without the payment of any royalty thereon or therefor.

What is claimed is:

1. A radiographic device for examining test objects comprising, a pair of support means having a common axis, a source of penetrating radiation disposed on the plane of said axis and in penetrating relation with a test object, a plurality of axially aligned beam-forming means in pivotal relation with the axis of said support means, means in motion-imparting relation with said beam forming means for imparting oscillatory pivoting motion to said beam-forming means, and detector means sensitive to emergent radiation from said test object.

2. A radiographic device for examining test objects comprising, a pair of support means having a common axis, a source of penetrating radiation disposed substantially on said axis and in penetrating relationship with a test object, a plurality of axially aligned beam-forming aperture means in pivotal relation with axis of said support means and in axially intersecting relationship with said test object, means in motion-imparting relation with said beam forming means for imparting oscillatory pivoting motion to said aperture means, detector means sensitive to said radiation mounted on the aperture means furthermost from said source and disposed on axis of said plurality, light-generating means in rigid mechanical relation and in operatively responsive relation to said detector means, and light-sensitive recording means in fixed static relation to said test object and exclusively exposed to light from said light-generating means.

3. Apparatus for the radiographic examination of test objects comprising, a pair of support means having a common axis, a source of penetrating radiation disposed between said support means substantially on the axis thereof and in penetrating relation with a test object, an arm member in pivotal relationship to said support means, a plurality of axially aligned collimating means mounted on said arm member and disposed on a propagational axis of said radiation incident upon and emergent from said test object, reciprocating motion-imparting means oscillating said arm member about said support axis, and radiation sensitive detector means disposed in the path of radiation emergent from said test object.

4. Apparatus for the radiographic examination of test objects comprising, a pair of support means having a common axis, a source of penetrating radiation disposed between said support means substantially on the axis thereof, and in penetrating relation to a test object, an arm member in pendant relationship to said support means, a plurality of axially aligned collimating means mounted on said arm member and disposed on a propagational axis of said radiation incident upon and emergent from said test object, reciprocating motion-imparting means oscillating said arm member about said support axis, detector means sensitive to said radiation mounted on the aperture means furthermost from said source and disposed on axis of said plurality, light-generating means in rigid mechanical relation and in operatively responsive relation to said detector means, and light sensitive recording means in fixed static relation to said test object and exclusively exposed to light from said light-generating means.

5. A device for rapid photographic recording of a radiographic image of a test object comprising, a source of penetrating radiation in penetrating relationship to a test object, detector means sensitive to said radiation disposed in the path of radiation emergent from said test object and movable throughout the area of said path about a point located substantially at said source, light-generating means mounted in fixed coaxial alignment with said source and said detector means and in operatively responsive relationship with said detector means, focusing means in focusing relationship with incident light from said light-generating means, and photographic means statically located in the path of said emergent radiation but exposed exclusively to focused light from said light-generating means.

6. A device for the radiographic examination of test objects comprising, a pair of trunnion support means, a source of penetrating radiation fixedly disposed between said support means substantially on the axis thereof and in penetrating relation with a test object, a carriage member in oscillatory pendant relation to said support means, an arm member pivotally mounted on said carriage member, a plurality of axially aligned upper collimating means mounted on said arm member and in collimating relation to radiation from said source incident upon said test object, lower collimating means variably mounted on said carriage member and disposed to collimate radiation emergent from said test object, detector means sensitive to radiation from said source rigidly mounted on said lower collimating means and axially aligned with said upper and lower collimating means, light-generating means, photographic recording means in fixed static relationship to said test object and exposed exclusively to light from said focusing means, motion-imparting means in driving relationship with said pendant carriage member to oscillate said member about said trunnion axis, transverse motion-imparting means rigidly mounted on said carriage member and pivotally driving said upper collimating means arm member about its pivotal mounting point and synchronously driving said lower collimating means transversely to the direction of carriage oscillation, center correction means modifying the transverse pivotal motion of said upper collimating means to maintain the collimating relationship of said means to said radiation source during said transverse motion.

HERMAN F. KAISER.

REFERENCES CITED

The following references are of record in the file of this patent:

UNITED STATES PATENTS

| Number | Name | Date |
| --- | --- | --- |
| 2,347,638 | McLachlan, Jr. | Apr. 25, 1944 |
| 2,370,163 | Hare | Feb. 27, 1945 |